United States Patent

Ziebarth et al.

[11] Patent Number: 5,413,771
[45] Date of Patent: May 9, 1995

[54] SOX/NOX SORBENT AND PROCESS OF USE

[75] Inventors: Michael S. Ziebarth, Columbia; Michael J. Hager, Baltimore; Jean W. Beeckman, Columbia; Stanislaw Plecha, Baltimore, all of Md.

[73] Assignee: W. R. Grace & Co.-Conn., New York, N.Y.

[21] Appl. No.: 955,771

[22] Filed: Nov. 6, 1992

Related U.S. Application Data

[62] Division of Ser. No. 690,466, Apr. 24, 1991, Pat. No. 5,180,703.

[51] Int. Cl.$^6$ .................. C01B 21/00; C01B 17/00
[52] U.S. Cl. .................. 423/239.1; 423/244.01
[58] Field of Search .................. 423/244.01, 239, 235, 423/235 D

[56] References Cited

U.S. PATENT DOCUMENTS

| | | | |
|---|---|---|---|
| 3,551,093 | 12/1970 | Meyers | 502/8 |
| 3,957,952 | 5/1976 | Naber | 423/224 |
| 4,061,594 | 12/1977 | Michel | 252/462 |
| 4,323,544 | 4/1982 | Magder | 423/570 |
| 4,459,371 | 7/1984 | Hobbs et al. | 423/244.01 |
| 4,514,511 | 4/1985 | Jacques et al. | 502/8 |
| 4,609,537 | 9/1986 | Tolpin et al. | 423/244.01 |
| 4,798,711 | 1/1989 | Neal | 423/239 |

FOREIGN PATENT DOCUMENTS

1524886  9/1978  United Kingdom.

Primary Examiner—Gary P. Straub
Attorney, Agent, or Firm—Beverly K. Johnson

[57] ABSTRACT

An alumina sorbent capable of adsorbing NOx and SOx from waste gases and being regenerated by heating above 600° C. is made by incorporating an alumina stabilizing agent into the sorbent. A preferred method is to add the stabilizer when the alumina is precipitated. The precipitated powder is formed subsequently into a slurry, milled and dripped to form the stabilized spheroidal alumina particles. These particles are impregnated with an alkali metal or alkaline earth metal to form the stabilized sorbent. Alumina stabilizers include one or more of silica, lanthana, other rare earths, titania, zirconia and alkaline earths.

6 Claims, 3 Drawing Sheets

SOX/NOX SORBENT AND PROCESS OF USE

The Government of the United States of America has rights in this invention pursuant to Contract No. DE-AC22-89PC88889 awarded by the U.S. Department of Energy.

This is a division of application Ser. No. 690,566, filed Apr. 24, 1991 now U.S. Pat. No. 5,180,703.

BACKGROUND OF THE INVENTION

1. Field of Invention

This invention relates to an improved sorbent for removing NOx and SOx from exhaust gases and the improved removal process using that sorbent.

2. Description of the Previously Published Art

The NOXSO process, described in U.S. Pat. No. 4,798,711, uses a porous alumina sorbent containing sodium to adsorb NOx and SOx from flue gases. After the adsorption the nitrogen- and sulfur-laden sorbent is regenerated by heating the sorbent in a reducing atmosphere.

In addition to other preferred reducing atmospheres for regenerating, methane gas is also disclosed. However, by using natural gas or methane the regenerator operates at a higher temperature of about 650° C. which tends to further reduce the surface area of the alumina beads.

As this NOXSO sorbent cycles back and forth from adsorption to regeneration, it undergoes transformations which reduce its surface area. In the fresh condition the alumina sorbent has a surface area on the order of about 200 $m^2/g$. After about 100 cycles the surface area of the sorbent is reduced to blow 50 $m^2/g$. When the surface area becomes that low, the performance becomes unacceptable.

3. Objects of the Invention

It is an object of this invention to develop a sorbent with a stable surface area and pore volume at regenerator conditions in the presence of sodium or other alkali metals.

It is further object of this invention to provide a stabilized surface area sorbent for use in adsorbing NOx and SOx from a flue gas.

It is further object of this invention to provide a sorbent with stable surface area under hydrothermal conditions in the presence of sodium.

It is further object of this invention to provide a sorbent with stable long term performance with regard to $NO_x/SO_x$ adsorption after prolonged adsorption/regeneration cycling.

It is further object of this invention to provide a sorbent with low attrition characteristics upon adsorption/regeneration cycling.

It is further object of this invention to provide a sorbent which retains its integrity when it is in the bead form.

It is further object of this invention to provide alternative processes to produce a stabilized surface area sorbent for use in adsorbing NOx and SOx from a flue gas.

It is further object of this invention to provide a process for the continued removal of nitrogen oxides and sulfur oxides from a gas containing them with a stabilized sorbent which can undergo regeneration at high temperatures and under hydrothermal conditions.

These and further objects will become apparent as the description of the invention proceeds.

SUMMARY OF THE INVENTION

A sorbent for NOx and SOx has been developed which retains a relatively high surface area after continuous use in a cycled adsorption/regeneration process. The sorbent can also adsorb other impurities such as chlorides, HCl, and heavy metals such as arsenic, lead, etc. The sorbent is made by adding a stabilizer to an alumina forming slurry. A preferred alumina stabilizer is silica which can be added in the form of sodium silicate. When making alumina from a slurry, the slurry conventionally contains, for example, aluminum sulfate and sodium aluminate which react to form alumina. According to the preferred embodiment of the invention, an alumina stabilizer such as silica is further added to this slurry. The three ingredients coprecipitate. This silica alumina coprecipitate is preferably filtered, washed and dried to a powder. The powder is then easily transported to where the beads are to be formed. There the powder is slurried in a water/nitric acid/acetic acid mixture and dripped in a drip column containing a $NH_3$-liquid hydrocarbon phase on top of an aqueous ammonia phase. The silica stabilized alumina beads are dried and calcined and then impregnated with up to 1–20 wt % with an active ingredient of either an alkali metal or alkaline earth metal and preferably with sodium at about 4–6 wt %, by the incipient wetness technique.

DESCRIPTION OF THE PREFERRED EMBODIMENTS

We have found that for our sorbent use, the alumina stabilizer used can be our preferred silica as well as other alumina stabilizers. For example, lanthana, other rare earths, titania, zirconia, clay and alkaline earths such as calcium and barium either alone or in mixtures can be used to make a stabilized sorbent for our intended purpose. The amount is preferably from an effective amount up to about 30 mole %.

We have found at least three techniques to add the stabilizer to the alumina when forming beads by the dripping method.

In the event the stabilizer can be mixed with alumina precursor materials without making the solution too viscous, then our preferred first embodiment for production is by co-precipitating to make the sorbent such as by co-gel formation. This technique is described by Nozemack et al in U.S. Pat. No. 4,780,446, the entire contents of which is incorporated herein by reference.

There a silica stabilized alumina is prepared as a co-gel by a precipitation process under specific and controlled reactant concentrations and reaction temperature, time, and pH. A source of an acid aluminum salt, preferably an aluminum sulfate solution, a source of alkali metal aluminate, preferably sodium aluminate solution and a source of alkaline metal silicate, preferably sodium silicate solution are combined to obtain a silica-alumina co-gel reaction mixture.

The cogellation reaction is conducted in two stages:

(1) An initial co-gel is precipitated at a pH of about 7.5 to 8.5 and preferably about 8; and (2) The precipitated co-gel is stabilized at a pH of about 9.6 to 10.3 and preferably about 10.

The desired reaction pH is maintained by controlling the flow rate of the aluminum sulfate, sodium aluminate and sodium silicate reactants. Furthermore, sufficient sodium silicate is added to impart a total silica ($SiO_2$) content of the finished precipitated co-gel of from an effective stabilizing amount up to about 30 mole % and more preferably from about 5.5 to 8.5 percent by weight $SiO_2$.

The alumina stabilizers that can be added by this co-precipitation process include silica, lanthana, other rare earths, titania, zirconia, or alkaline earths such as calcium or barium.

The stabilized alumina powder is then used to make substantially uniform spheroidal alumina particles. A preferred procedure for making the spheres is described in U.S. Pat. No. 4,279,779, the entire contents of which is incorporated herein by reference. Following this procedure, a slurry of the stabilized alumina is prepared in an acidic aqueous medium and droplets of the slurry are passed through air into a column containing an upper body of a water immiscible liquid such as a liquid hydrocarbon and ammonia and a lower body of aqueous alkaline coagulating agent. The resulting spheroidal particles are aged in aqueous ammonia to the desired hardness. The aged particles are dried and calcined.

Figure 1:
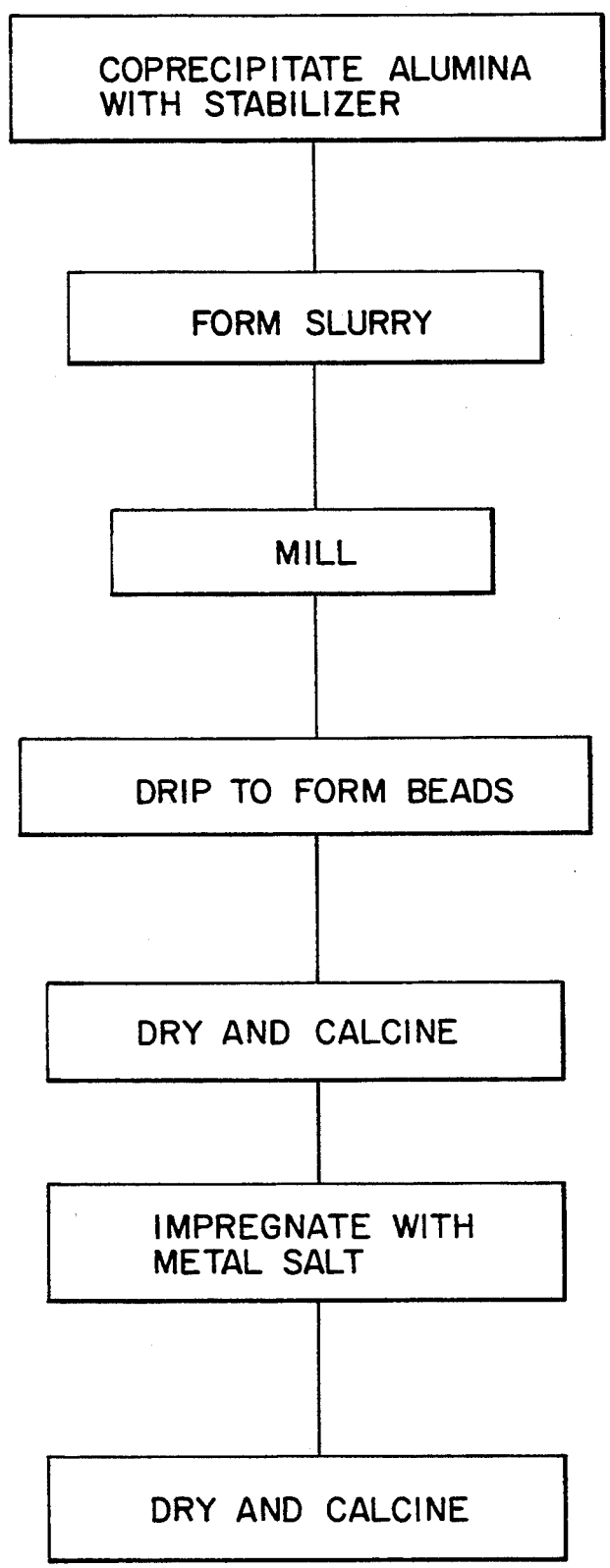
FIG. 1 is a schematic diagram of the process of making the stabilized alumina containing sorbent.

The improved process used to manufacture the sorbent is illustrated in FIG. 1 and is briefly described below. A slurry is prepared using a mixture of stabilized alumina powder, water, and acids such as acetic acid and nitric acid. The slurry is then preferably reduced in size such as by the preferred method of milling to reduce the average particle size from greater than 10 microns to 2–5 microns. Although the sorbent can be made without the preferred milling step, the resulting beads tend to have a low compacted bulk density, a high attrition rate and a low crush strength. Thus the particle size reduction by milling is the preferred procedure.

Other size reduction techniques can be used such as dry milling, hammer milling, ball milling and fluid energy milling. These techniques can be either wet or dry procedures.

The slurry is fed to a large, commercial scale Netzsch Mill at a rate of 4 gallons/minute. The mill itself contains from 40–55 gallons of 1.5 mm Quackenbush beads which are continuously moved around internally by disks attached to a rotating axis. Slurry particles are then grounded down to the desired particle size by the action of the glass beads. Control of particle size is established by withdrawal or addition of specific amounts of glass beads.

After milling, the slurry is dripped in a dripping column which preferably consists of ammoniated kerosene on top of an ammoniated water solution. The organic phase is needed to form spheres-while the aqueous phase further hardens the beads. After dripping, the beads are transferred to a de-watering system and then passed through a dryer with a flow of air through the beads. After drying, the sorbent is calcined in an indirect fired rotary kiln. Over and undersized particles are removed in a vibratory separator. Next, impregnation with the active ingredient which is an alkali metal or an alkaline earth metal and preferably sodium as $Na_2CO_3$ is performed. This can be done in a horizontal rotary drum impregnator. Finally, the sorbent is dried and calcined to yield the final product.

The second method of adding the alumina stabilizer is to mix it with the alumina powder prior to dripping to form the particles. All of the stabilizers including clay can be added in this procedure.

The third method of adding the alumina stabilizer is to form the alumina particle by the dripping method and to then impregnate the particle with the alumina stabilizer. The stabilizer can be added either before or after the sodium is added or to reduce production costs it can be added along with the sodium. Again, all of stabilizers can be added this way except for clay since it is not soluble.

Additional bead forming procedures can be used to make the beads in addition to these dripping methods discussed above. The ingredients can be mixed together and the mixture can be extruded to form extrudates with preferably an approximate 1:1 ratio of length to diameter. The mixture can be placed in an agglomerator to agglomerate the beads. Other mechanical forming methods can be used such as pilling.

The NO and $SO_2$ adsorption performance of the sorbent was measured in an adsorption/regeneration cycling unit. The unit is a batch-operated fluidized bed with flue gas containing 3000 ppm $SO_2$, 500 ppm NO, 4% $O_2$ and 10% $H_2O$. The cycle begins with these gases flowing through the fluidized sorbent bed at a temperature of about 140° C. The average conditions over the first 10 minutes of this batch-operated fluidized bed run are approximately equivalent to the conditions the sorbent will experience in intended industrial use with a design sorbent loading of 1.5 wt % sulfur. The run continues for an additional 10 minutes where a sulfur loading of about 2.5% is obtained. The NO adsorption performance over this time period is measured continuously with a Thermo Electron Instruments chemiluminescent NO analyzer. The $SO_2$ adsorption performance is measured by sulfur analysis of sorbent samples pulled at 2–5 minute intervals from the fluidized bed. The adsorption phase is stopped and the beads are then regenerated in methane for 20 minutes at 650° C. followed by a steam treatment for 20 minutes at 650° C. The regenerated beads are allowed to cool down to the adsorption temperature in the range of 120°–160° C. with the preferred target temperature being 140° C.

After a given number of cycles, the beads are removed from the batch adsorption/regeneration apparatus and they are evaluated for surface area. The NO desorption is analyzed by temperature programmed desorption. The beads are also placed in a regenerator connected to a gas chromatograph and the desorption of $SO_2$ is measured for a 20 minute interval while methane is passed over it at 650° C. This produces a product distribution of S, $SO_2$ and $H_2S$. Then steam is passed over the sorbent at 650° C. for 20 minutes to remove any residual $H_2S$.

The following sections describe the test procedures used and referred to in the claims. For the attrition and crush tests the beads are screened to pass through 10 mesh and remain on 20 mesh.

Sorbent Cycle Stability

To evaluate the effective life of the sorbents we use a Sorbent Cycle Stability procedure. Under this procedure, we compare the surface area after 20 adsorption/regeneration cycles (a sufficient period of time for the initial high surface area of the fresh sorbent to drop down to a working level) with the surface area after 100 cycles. This is a significantly long period of time to evaluate how the sorbents have stood up to the recycled conditions. For the sorbents made according to the present invention, they typically have their surface area drop from a fresh value of over 200 m²/g to about 150 m²/g by the 20th cycle. Then after 80 more cycles, the surface area drops less than 60 m²/g. Other alumina sorbent particles having the same amount of sodium will loose substantially more than 60 m²/g of surface area under this same test condition and they will have a lower total surface area.

Crush Strength

Crush strength is determined by placing the spheroidal particle between two parallel plates of a testing machine such as Ametek force gauge model ML4434-4 manufactured by AMETEK Co., 8600 Somerset Drive, Largo, Florida, which is mounted on a motorized test platform. The bottom plate is the anvil and the upper is the platen. By pressing the starter button the plates are slowly brought together and the force gauge moves down the motorized platform at 0.0491 inch/second. The amount of force required to crush the particle is registered on a digital readout which has been calibrated in pounds force. A sufficient number (for example, 25) of riffled particles are each individually crushed to obtain a statistically significant representation of the total population. The average of the individual results is then calculated. To make sure the beads are measured at constant conditions, they are placed in a porcelain evaporating dish and heated by an electric bunsen burner at a temperature of at least 400° C. A bead is then removed from the dish and its crush strength is determined while it is still hot.

When the beads are to be used in a fluidized bed environment it is preferred to have an average crush strength of at least 4 pounds. The significance of having this high crush strength value is that the beads will not break apart during the severe physical treatment they receive in the fluidized bed and the other mechanical devices present in a commercial plant.

GM-Attrition

The attrition is measured by the Air Jet Attrition procedure which involves placing a set volume (60 cc.) of material to be tested in an inverted Erlenmeyer flask of special construction which is connected to a metal orifice inlet. A large (one inch) outlet covered with 20-mesh screening is located on the :flat side (bottom) of the flask. High velocity dry nitrogen gas is passed through the inlet orifice causing the particles to:
(1) circulate over one another thus causing attrition, and
(2) impact themselves in the top section of the flask thus breaking down as a function of strength. The material is tested for five minutes and the remaining particles are weighed. The loss in weight after testing expressed as percent of the initial charge is designated the attrition loss.

✦ The nitrogen flow will be in the range of about 3.1 to 4.0 cubic feet per minute, depending upon the density of the material. The flow rate must be sufficient for the particles to strike the top section of the flask. The fines produced by attrition are carried out of the flask by the nitrogen flow thus causing a loss in weight of the original material charged.

The significance of a low attrition value is that the particles are not easily being attrited away as they are fluidized in the adsorber, the regenerator and the fluidized transport between these two units. In a large scale unit it is expected that an economical sorbent should have less than 1.2% attrition loss per day. In terms of the Air Jet Attrition procedure described above with the Erlenmeyer flask, it is desirable to have less than 2% and for preferable commercially acceptable performance to have less than 1% loss in that accelerated attrition test.

Attrition During Adsorption/Regeneration Cycling

An adsorption/regeneration cycling test is used to measure the adsorption/regeneration cycling (ARC) attrition of the sorbent. Sorbent that has a size range between 10 and 20 screen mesh is adsorbed at 140° C. in a batch-operated fluidized bed with flue gas containing 3000 ppm $SO_2$, 500 ppm NO, 4% $O_2$ and 10% $H_2O$ until it contains 1.5–2% sulfur. The sorbent is then regenerated with methane for 20 minutes at 650° C. followed by stream treatment for 20 minutes at 650° C. This adsorption/regeneration process is repeated a second time. The sorbent is then screened and weighted. All sorbent smaller than 35 mesh in size is considered attrited material. The % attrition per day is based on the percent of the total material that is smaller than 35 mesh and is then normalized to reflect 8 adsorption/regeneration cycles per day. A chemical attrition value of less than 10% per day is clearly needed, preferably less than 5% per day and more preferably less than 1.2% per day on this test for a commercial sorbent which will be subjected to a fluidized bed operation.

Surface Area

The surface areas referred to throughout this specification and claims are the nitrogen BET surface areas determined by the method described in the article by S. Brunauer, P. Emmett, and E. Teller, J. Am. Chem. Soc., Vol. 60, p. 309(1938). This method depends on the condensation of nitrogen into the pores, and is effective for measuring pores with pore diameters in the range of 10 to 600 Å. The volume of nitrogen adsorbed is related to the surface area per unit weight of the support.

Compacted Bulk Density

To determine the compacted bulk density a given weight of freshly calcined spheroids is placed in a graduated cylinder sufficient to contain the material within its graduated volume. The cylinder is then vibrated until all settling ceases and a constant volume is obtained. The weight of sample occupying a unit volume is then calculated.

Total Porosity

The pore size distribution within the activated spheroidal particle and total porosity is determined by mercury porosimetry. The mercury intrusion technique is based on the principle that the smaller a given pore the greater will be the mercury pressure required to force mercury into that pore. Thus, if an evacuated sample is exposed to mercury and pressure is applied incrementally with the reading of the mercury volume disappearance at each increment, the pore size distribution can be determined. The relationship between the pressure and the smallest pore through which mercury will pass at the pressure is given by the equation:

$$r = 2\sigma \cos\theta / P$$

where
r = the pore radius
$\sigma$ = surface tension
$\theta$ = contact angle
P = pressure Using pressures up to 60,000 p.s.i.g. and a contact angle of 130° the range of pore diameters encompassed is 35-10,000 Å.

The mercury porosimetry measures the total mercury pore volume in cm$^3$/g. The particle density is also measured in terms of g/cm$^3$. By multiplying the two together the total porosity is determined in units of cm$^3$/cm$^3$.

Hydrothermal Stability

The BET surface area stability of the sorbent under hydrothermal conditions is measured by subjecting the sorbent beads to a 100 volume % steam atmosphere at 650° C. and the surface area is measured at regular intervals. Using this test the sorbent should retain at least 100 m$^2$/g of surface area after 1500 hours in the steam and preferably greater than 140 m$^2$/g.

Having described the basic aspects of our invention, the following examples are given to illustrate specific embodiments thereof.

EXAMPLE 1

Following the procedure described in U.S. Pat. No. 4,780,446 a silica stabilized alumina powder was produced. The powder contained 6.5% silica. This powder is commercially available from Davison Chemical Division of W. R. Grace & Co.-Conn. as silica alumina. The powder contains 28% moisture when heated to 1750° F. The average particle size of the powder is 15-20 microns when measured by the Malvern Particle Analyzer.

EXAMPLE 2

Following the procedure described in U.S. Pat. No. 4,154,812 an alumina powder was produced. This powder is commercially available as SRA Alumina from Davison Chemical Division of W. R. Grace & Co.-Conn. The powder contains 28% moisture when heated to 1750° F. The average particle size of the powder is 15-20 microns when measured by the Malvern Particle Analyzer.

EXAMPLE 3

One hundred pounds (dry basis) of the silica stabilized alumina made in Example 1 was slurried in a mixture of 30 gallons water, 2404 grams 70% nitric acid and 3,237 grams of glacial acetic acid and mixed in a high shear mixer for 25 minutes. The slurry was then milled in a 20 liter Netzsch Mill. The average particle size was reduced to less than 5 microns. The slurry was afterwards dripped in a column containing an NH$_3$ kerosene phase on top of an aqueous NH$_3$ phase. The wet spheres were then dried and air calcined. The silica stabilized alumina spherical particles were impregnated at two levels of sodium. In one batch they were impregnated to 4 wt % sodium using sodium carbonate with the incipient wetness technique and in the other batch they were impregnated to 6 wt. % sodium. This technique involves permitting the beads to adsorb an amount of liquid equivalent to 80-100% of their pore volume. The particles were then dried at 120° C. in a vacuum oven and air calcined for 6 hours at 650° C.

The particles impregnated at 4% sodium (to be identified as 3A) had a surface area of 254 m$^2$/g, a compacted bulk density of 39 lbs/ft$^3$, an average crush of 10.2 pounds, a total porosity measured by mercury of 0.712 cm$^3$/cm$^3$ and a GM attrition loss of 0.2%.

The particles impregnated at 6% sodium (to be identified as 3B) had a surface area of 210 m$^2$/g, a compacted bulk density of 40 lbs/ft$^3$, an average crush of 8 pounds, a total porosity measured by mercury of 0.714 cm$^3$/cm$^3$, a GM attrition loss of 0.1% and an ARC attrition loss of 0.3%.

Figure 2:
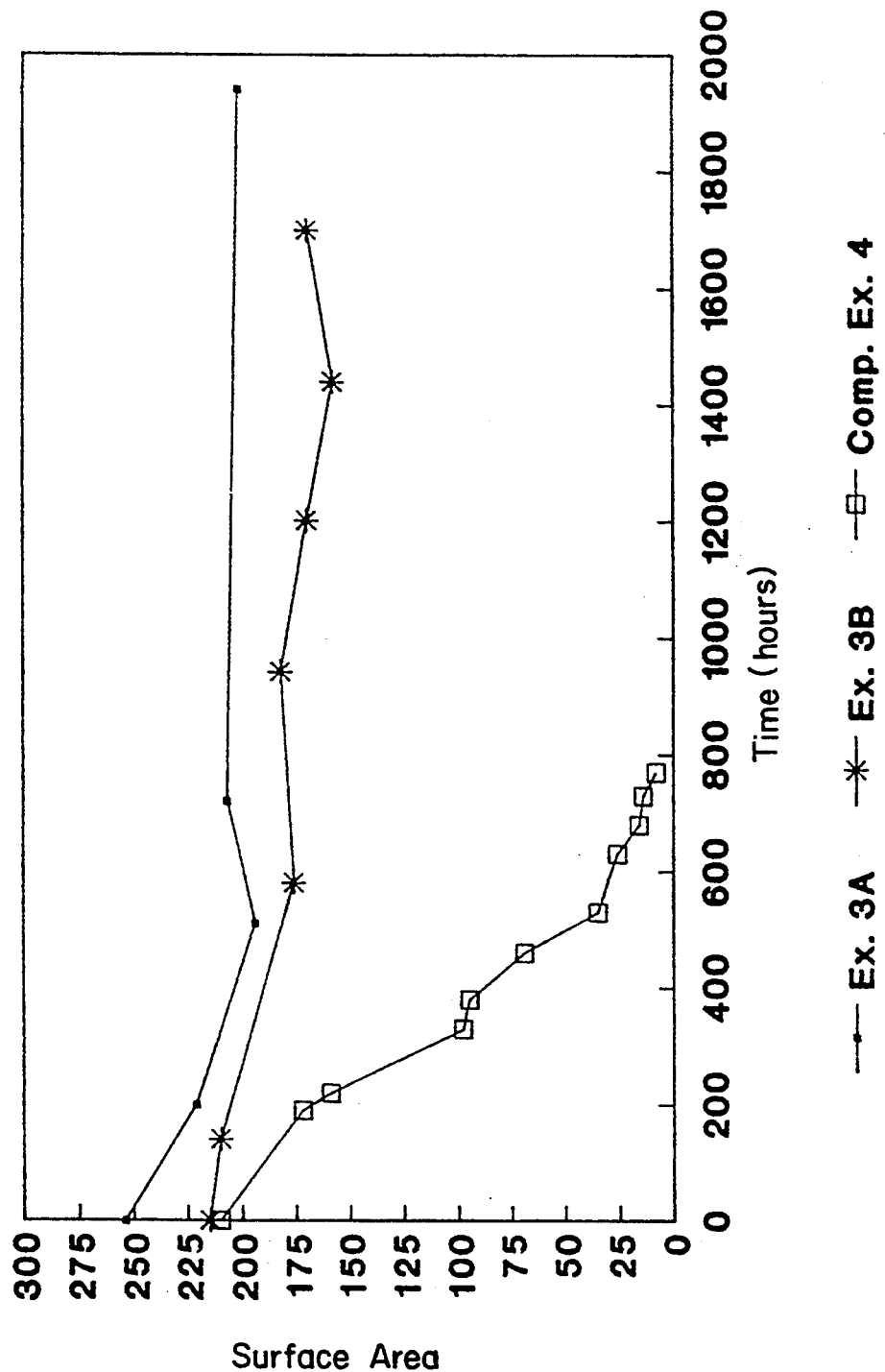
FIG. 2 illustrates the stability of the sorbents to steam.

To test the hydrothermal stability of the beads, the particles were exposed to a 100 vol % steam atmosphere at 650° C. and the surface area was measured at regular intervals. FIG. 2 shows that the sorbent having the 4% sodium stabilizes at 200 m/$^2$g and the sorbent having the 6% sodium stabilizes at 170 m/$^2$g.

COMPARISON EXAMPLE 4

An alumina dripping slurry was prepared in the same manner as given in Example 3, except that the alumina powder from Example 2 was used which does not contain any silica. When it was initially slurried 20 gallons of water were used instead of 30 gallons to obtain the desired viscosity. It was dripped and impregnated to the same level of sodium and afterwards dried and calcined as given in Example 3A. Exposure to 100 vol % steam at 650° C. then showed a steep decline of surface area as shown in FIG. 2.

The particles had a surface area of 211 m$^2$/g, a compacted bulk density of 35.9 lbs/ft$^3$, an average crush of 6.9 pounds, a total porosity measured by mercury of 0.676 cm$^3$/cm$^3$, a GM attrition loss of 0.7%, and an ARC attrition loss of 0.2%.

EXAMPLE 5

The silica containing sorbent of Example 3B and the nonsilica containing sorbent of Comparison Example 4 were evaluated by the Sorbent Cycle Stability procedure. These two samples have different sodium levels. However, it is believed that a comparison between the two is fair with regard to surface area properties.

If one had the same substrate with different sodium levels, the sorbent with the higher sodium level would have the lower surface area because the additional sodium would be covering (i.e. taking up) the additional surface area. See Example 3 where the 3A sorbent with 4% Na has a surface area of 254 m$^2$/g while the 3B sorbent with the higher Na level of 6% has a lower surface area of 210 m$^2$/g. Thus by having the larger amount of sodium for the sorbent according to the present invention, there should be less surface area than the sorbent with the smaller amount of sodium and thus the comparison is believed to be fair because one would expect that the comparison sorbent of Comparison Example 4 would have the greater starting surface area than the sorbent of Example 3B with its higher sodium loading. Note, however, that the fresh sorbent of Example 3B (with the higher amount of sodium) actually has about the same surface area. The reason appears to be because the added silica which acts as the stabilizer also provides additional surface area to make up for the surface area lost by the additional sodium.

The sorbent according to the present invention in Example 3B was cycled 232 times and the surface area ultimately decreased to 70 m$^2$/g. Sorbent made according to Comparison Example 4 without the stabilizer after being only cycled 100 times already had its surface area down to 60 m/g. The change in surface area over cycles is set forth in FIG. 3.

Figure 3:
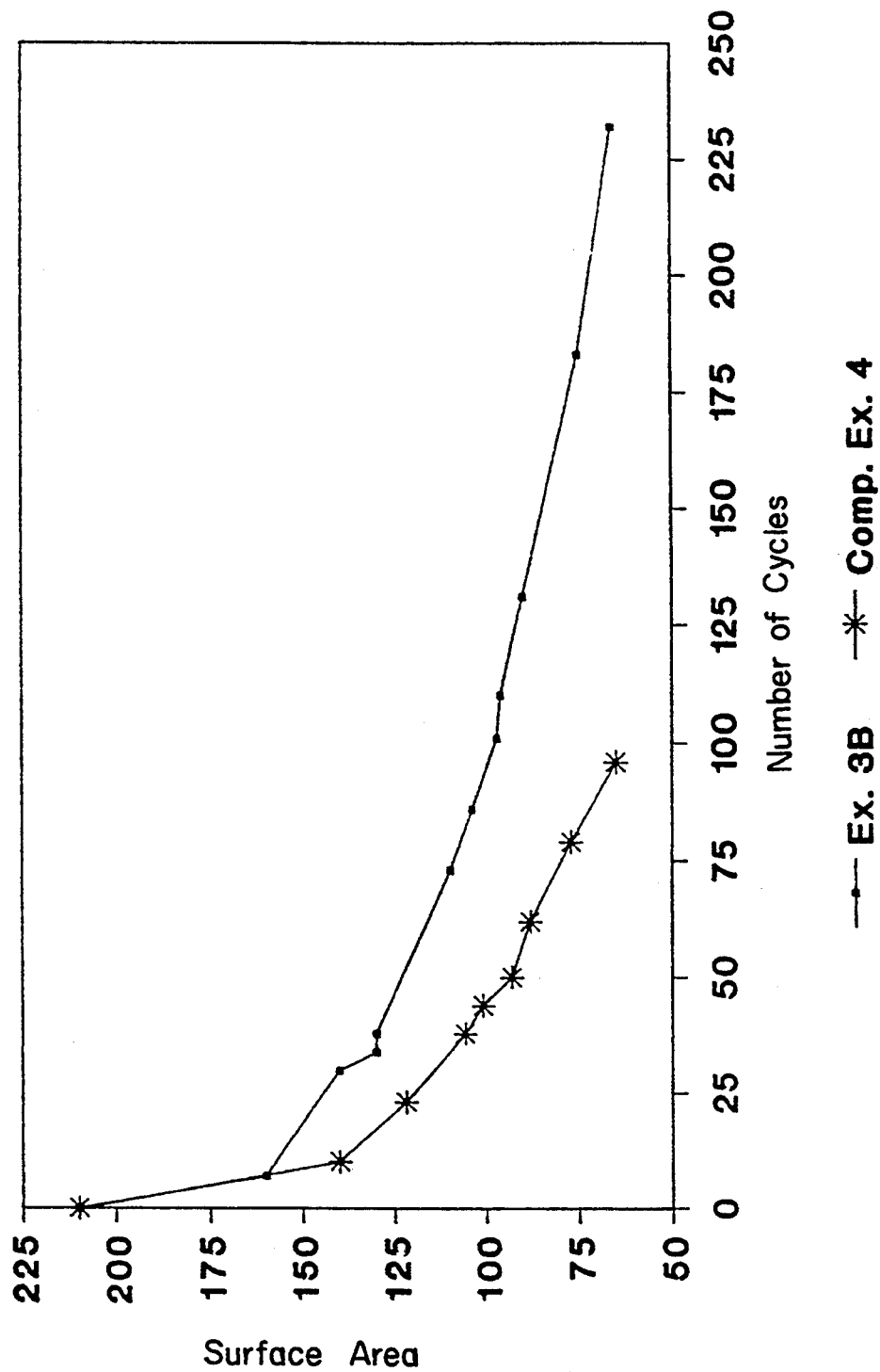
FIG. 3 illustrates the improved retention of surface area over time for the sorbent according to the present invention in a cycled adsorption/regeneration process.

The drop off in performance can be further seen from the data taken from FIG. 3 and presented in Table 1 below by comparing the surface area of the sorbent after 20 cycles with that after 100 cycles and also comparing the rate of surface area decay between the 20th and 100th cycle.

TABLE 1

| Drop | Surface Area, m$^2$/g | | |
|---|---|---|---|
| | 20 cycles | 100 cycles | |
| Example 3B | 150 | 100 | 50 |
| Comp. Example 4 | 125 | 60 | 65 |

Without the stabilizer the surface area drops off 65 m$^2$/g over the 80 cycles to a low level of 60 m$^2$/g whereas for the sorbent with the stabilizer present according to the present invention the surface area only drops off 50 m$^2$/g during the 80 cycles and the surface area remains at a higher, superior level of 100 m$^2$/g. The sorbent according to the present invention with the silica stabilizer has a higher surface area. Although this is very favorable, the even more significant advantage is that the rate of decrease in surface area for the silica stabilized sorbent is slower than the rate of decrease in surface area for the unstabilized sorbent.

It is understood that the foregoing detailed description is given merely by way of illustration and that many variations may be made therein without departing from the spirit of this invention.

What is claimed is:

1. In the NOXSO process for removal of nitrogen oxides and sulfur oxides from a gas containing them with a sorbent and for the regeneration of said sorbent comprising:
   (a) contacting said gas at a temperature of about 85° C. to about 200° C., with said sorbent to adsorb said nitrogen oxides and sulfur oxides on said sorbent and remove said nitrogen oxides and sulfur oxides from said gas;
   (b) subsequently, withdrawing said nitrogen oxides adsorbed on said sorbent in the form of nitrogen oxides carried away in a hot gas stream; and
   (c) subsequently, withdrawing said sulfur oxides adsorbed on said sorbent;
   (d) subsequently, cooling said sorbent; and
   (e) repeating steps (a), (b), (c) and (d); the improvement comprising using as the sorbent stabilized spheroidal alumina particles having a surface area of about at least 180 square meters per gram;

a compacted bulk density of about 20 to about 45 pounds per cubic foot;

an average crush strength of at least 4 pounds, an attrition loss measured by the Air Jet Attrition method of less than 2%;

an alumina stabilizer in an amount from an effective amount up to about 30 mole %, wherein said alumina stabilizer is silica; and an active ingredient of a metal selected from the group consisting of alkali metals, alkaline earth metals and mixtures thereof and present in an amount of from about 1 to 20 wt %, said sorbent when subjected to the Sorbent Cycle Stability procedure having its surface area dropping less than 60 M$^2$/g from the 20th to the 100th cycle, and said sorbent when subjected to the Hydrothermal Stability procedure maintaining a BET surface area of at least 100 m$^2$/g.

2. A process according to claim 1 for removal of nitrogen oxides and sulfur oxides from a gas containing them with a sorbent and for the regeneration of said sorbent, wherein the active ingredient is sodium.

3. A process according to claim 2 for removal of nitrogen oxides and sulfur oxides from a gas containing them with a sorbent and for the regeneration of said sorbent, wherein the active ingredient is present in an amount of from about 4 to 6 wt %.

4. A process according to claim 1 for removal of nitrogen oxides and sulfur oxides from a gas containing them with a sorbent and for the regeneration of said sorbent, wherein the nitrogen oxides and sulfur oxides are adsorbed by the sorbent at a temperature up to 160° C.

5. A process according to claim 1 for removal of nitrogen oxides and sulfur oxides from a gas containing them with a sorbent and for the regeneration of said sorbent, wherein regeneration of the sorbent is at a temperature of above 600° C.

6. A process according to claim 1 for removal of nitrogen oxides and sulfur oxides from a gas containing them with a sorbent and for the regeneration of said sorbent, wherein the nitrogen oxides and sulfur oxides is continuously removed by repeating steps (a)–(e).

* * * * *